United States Patent
Rados et al.

(10) Patent No.: US 7,379,705 B1
(45) Date of Patent: May 27, 2008

(54) MOBILE STATION RANDOMIZING OF MESSAGE TRANSMISSION TIMING TO MITIGATE MASS MESSAGE EVENT

(75) Inventors: Steven R. Rados, Danville, CA (US); Chris S. Neisinger, Danville, CA (US)

(73) Assignee: Cellco Partnership, Bedminster, NJ (US)

(*) Notice: Subject to any disclaimer, the term of this patent is extended or adjusted under 35 U.S.C. 154(b) by 638 days.

(21) Appl. No.: 10/935,280

(22) Filed: Sep. 8, 2004

(51) Int. Cl.
*H04B 17/00* (2006.01)
*H04H 9/00* (2006.01)

(52) U.S. Cl. .................. 455/2.01; 725/10; 725/13
(58) Field of Classification Search ............. 455/2.01, 455/466, 550.1; 370/346, 432; 725/9, 10, 725/13
See application file for complete search history.

(56) References Cited

U.S. PATENT DOCUMENTS

| | | | |
|---|---|---|---|
| 6,259,776 B1 | 7/2001 | Hunt | |
| 6,690,661 B1* | 2/2004 | Agarwal et al. | 370/337 |
| 2001/0005670 A1 | 6/2001 | Lahtinen | |
| 2002/0012322 A1* | 1/2002 | Rooney | 370/252 |
| 2002/0159576 A1 | 10/2002 | Adams | |
| 2003/0100321 A1 | 5/2003 | Rao et al. | |
| 2004/0022366 A1 | 2/2004 | Ferguson et al. | |

* cited by examiner

*Primary Examiner*—Nguyen T. Vo
(74) *Attorney, Agent, or Firm*—McDermott Will & Emery LLP

(57) ABSTRACT

To mitigate the impact of a mass communication event, such as a mass voting event, on the resources of the mobile wireless communication network, each user's mobile station is adapted to appropriately adjust its timing of the transmission during the mass communication event. In a voting example, the mobile station delays sending the user's vote by a random time interval. When implemented in a substantial number of mobile stations, the mobile stations randomly delay their individual transmissions, effectively spreading the traffic over a larger time window, thereby reducing the instantaneous peak load on the wireless network. However, since the solution is implemented in the mobile stations, there is no added overhead traffic related to the event at or around the time of the event. Consequently, handling of the event requires less network capacity to account for this bursty traffic.

17 Claims, 3 Drawing Sheets

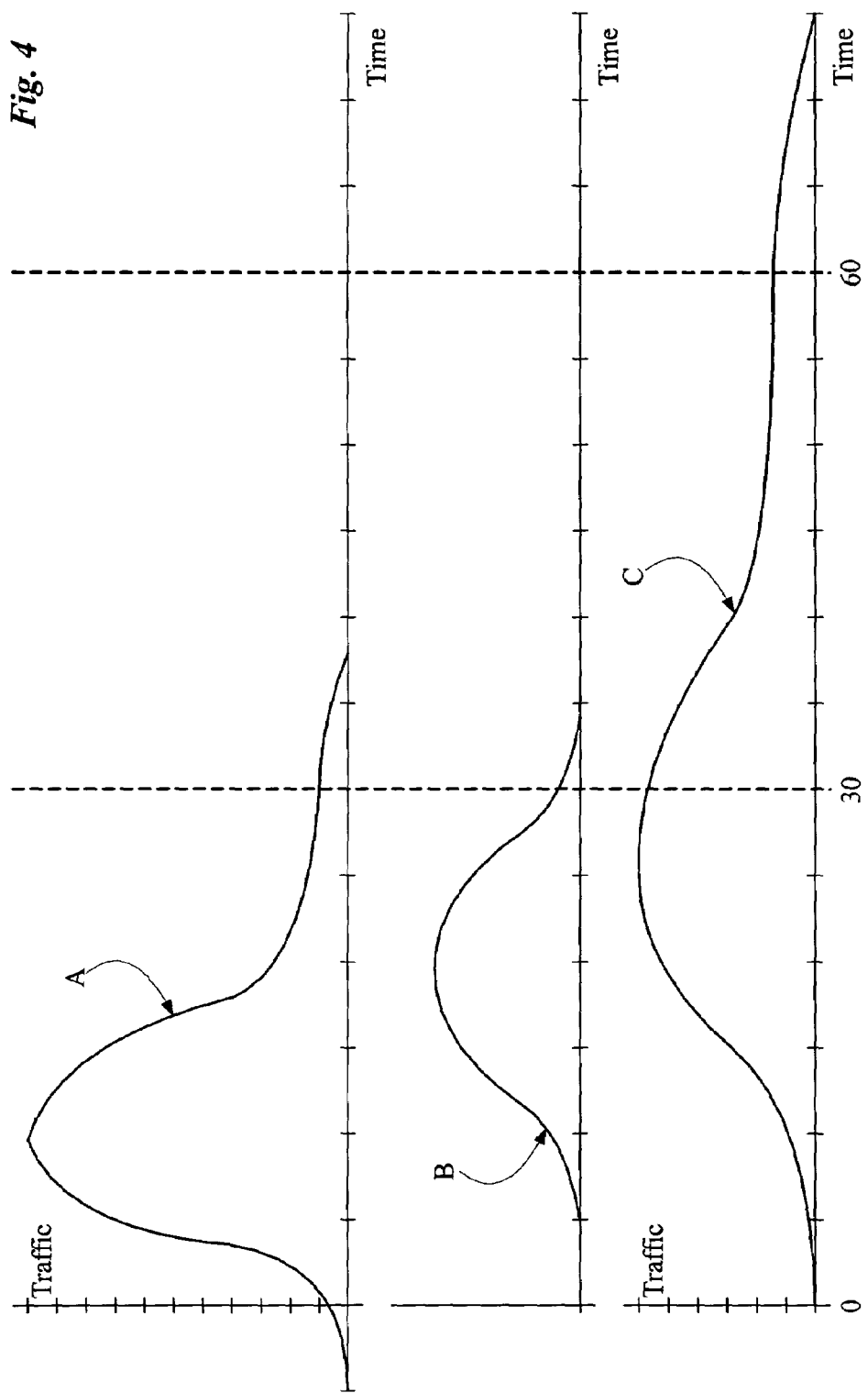

MOBILE STATION RANDOMIZING OF MESSAGE TRANSMISSION TIMING TO MITIGATE MASS MESSAGE EVENT

TECHNICAL FIELD

The present subject matter relates to techniques and equipment to control the timing of call or message transmissions in mass communication events, such as mass voting applications, through a mobile wireless communication network.

BACKGROUND

Modern networks offer users an increasing array of capabilities to communicate with each other and with automated systems. For example, telephone networks provide ubiquitous service throughout developed countries, allowing people to talk to each other almost anywhere. The development of public wireless telephone networks (e.g. cellular and PCS networks) has enhanced this communication ability by adding the convenience of almost limitless mobility. The Internet and packet-based data communications now enable rapid communication of a vast array of data, such as e-mail, web pages and multi-media content. Advanced versions of wireless networks extend the concept of wireless mobility to support similar data communication applications.

In addition to the traditional voice telephone-type communications and the common data communications such as e-mail and web browsing, such networks have been used for a variety of communications applications that entail high-volumes of message or call traffic in a very short period of time. Events occurring in such communication applications, which generate such high-volumes of message or call traffic in a very short period of time, are referred to herein as mass communication events. A common example of such an application involves voting, and an event in a voting application would be the occurrence of a high volume of voting traffic at a time called for a vote.

Mass traffic events, such as voting, first utilized the public switched telephone network. More recently, however, such communication applications have been extended to mobile wireless communication networks, to allow participation by mobile network subscribers using their increasingly ubiquitous wireless mobile stations. For example, Published US Patent Application 2003/0100321 to Rao et al. entitled "Instantaneous polling utilizing a message service mobile phone network," teaches use of a wireless short message service (SMS) for polling or the like.

The traffic generated by such a mass communication event poses problems for a mobile wireless communication network. During mass end-user messaging, such as voting for the "American Idol" program or a sports event voting, very large numbers of subscriber generated calls or short messages are transmitted via the wireless network in a very short time interval. To handle this mass traffic, a wireless network would need to be engineered to support an appropriate level of peak loading, which is costly or impractical. There is a need to mitigate the impact of such a mass communication event on the resources of the mobile wireless communication network.

Efforts to solve congestion problems due to mass call-in events through the landline telephone network have focused on network based control of the call flows. For example, U.S. Pat. No. 6,259,776 to Hunt, entitled "System for controlling telecommunication overload traffic," teaches overload control by network control of call gapping. An overload control function measures the period of time taken to handle a call switching request. If the time taken exceeds a pre-determined quality of service threshold, the control implements a call gapping function, which modifies the gapping period such that requests to effect calls to particular destinations are spaced. Any call arriving at a switching point prior to expiration of the gap period is automatically rejected by the local control processor.

Published US Patent Application 2002/0159576 to Anthony, entitled "Method for overload control in a telecommunications network and apparatus therefor," discloses a technique for suppressing overload in a UMTS type mobile network. The Anthony methodology entails receiving a signal that calls sent to a target node are being rejected. In response, the network reduces the rate of calls it sends to the target node.

Published US Patent Application 2004/0022366 to Ferguson et al., entitled "Apparatus, and an associated method, for detecting a mass call event and for ameliorating the effects thereof," teaches use of a detector to monitor call attempts. When more than a selected level of call attempts are made to a particular called station, within a selected period, a mass call event is considered to have occurred. A notifier initiates notification of other network elements in the telephonic network, and the rate at which call connections are permitted with the called station is limited during the duration of the mass call event.

Such network-centric control of the calls, by call gapping or the like, are difficult to implement in a mobile wireless network. Also, many such solutions delay a user's call for some period which is apparent to the user, by extended gaping or by actually blocking calls through the network. If the user perceived delay is extensive, or the network rejects the user's message or call too many times, the user may become dissatisfied with the experience and refrain from future participation, which diminishes the effectiveness and commercial value of the network-based voting application. Hence, the landline solutions have not adequately addressed the needs, particularly of the wireless network domain.

For a mobile network, US Patent Application Publication 2001/0005670 to Lahtinen, entitled "Method and system for the control of voting by telephone," teaches use of a polling server to authorize a predetermined initial proportion of the mobile stations to concurrently transmit a vote. The polling server sends the voting authorizations to the authorized mobile stations over a control channel. A voting application stored in or associated with each mobile station monitors the control channel and enables transmission of a vote only after the authorization has been received by that mobile station. Lahtinen suggests that this combination of server authorization and mobile station control application accommodates and assures the staggered transmission of votes in a telephonic poll, in order to avoid overloading of the network. Although this may reduce the peak load somewhat, the need to authorize stations to transmit actually results in overhead traffic during the event, added to the already heavy traffic load caused by the event.

SUMMARY

The teachings herein provide a more effective technique to mitigate the impact of a mass communication event on the resources of the mobile wireless communication network, by adapting a user's mobile station to appropriately adjust its timing of the transmission during the mass communication event. When implemented in a substantial number of mobile stations, for example, the mobile stations randomly delay their individual transmissions. This effectively spreads the call or message traffic over a larger time window, thereby reducing the instantaneous peak load on the wireless network. However, since the solution is implemented in the mobile stations, there is no added overhead traffic related to the event at or around the time of the event. Consequently, handling of the event requires less network capacity to account for this bursty traffic. Essentially, in the example, the traffic is spread by programming the mobile stations to provide random transmission delays.

A mobile station includes a control capability, typically implemented as an application that runs in the mobile station, for controlling communication during the mass event. In a voting example discussed in detail below, the subscriber device incorporates a mass voting capability (firmware or software based). When the subscriber is participating in a mass messaging event, the user initiates the mass messaging application (the voting application in the detailed example) in the mobile station. Based on voting application design, the user selects the voting venue or enters in the voting code and casts and submits her vote. From the user's perspective, the vote is cast. Based on preconfigured parameters, the mobile station application calculates a random delay value. After the random delay time has passed, the mobile station begins attempting to deliver the message. The transmission may be a call-in to a number related to the selected vote. Alternatively, the transmission may be a short message service (SMS) transmission or other data communication supported by the particular network and voting application. The randomized time delays, selected by many such mobile stations, effectively spread the message transmission attempts over a longer interval and reduce the peak load on the network.

The generation of a "random" delay relates to any procedure for selecting a delay value, without specific aim or purpose for selecting one delay value instead of another delay value. A specific example of the random delay generation algorithm utilizes a Gaussian distribution and defined minimum (Min) and maximum (Max) delay limits. A Gaussian function may be sufficiently random for the present purposes. Another example of a random function might generate a white noise type distribution, in which each number within a permissible range has a substantially equal probability of being generated each time that the random number algorithm is executed. Other algorithms may utilize pseudo-random number generation routines. Also, any such appropriate "random" number generation function may be seeded with various relevant data to produce a desired delay distribution. Instead of the Min/Max delay values, for example, the mathematical function that generates the random delay could utilize input or starting data of various types, including for example: MIN, MDN or ESN numbers of the mobile stations, last digits of MIN/MDN/ESN of the mobile stations, time of day, and expected network load/capacity.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

FIG. 4 comprises a series of time graphs, useful in explaining the traffic loading during a mass communication event and the effect of randomized delay of the mobile station transmissions.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
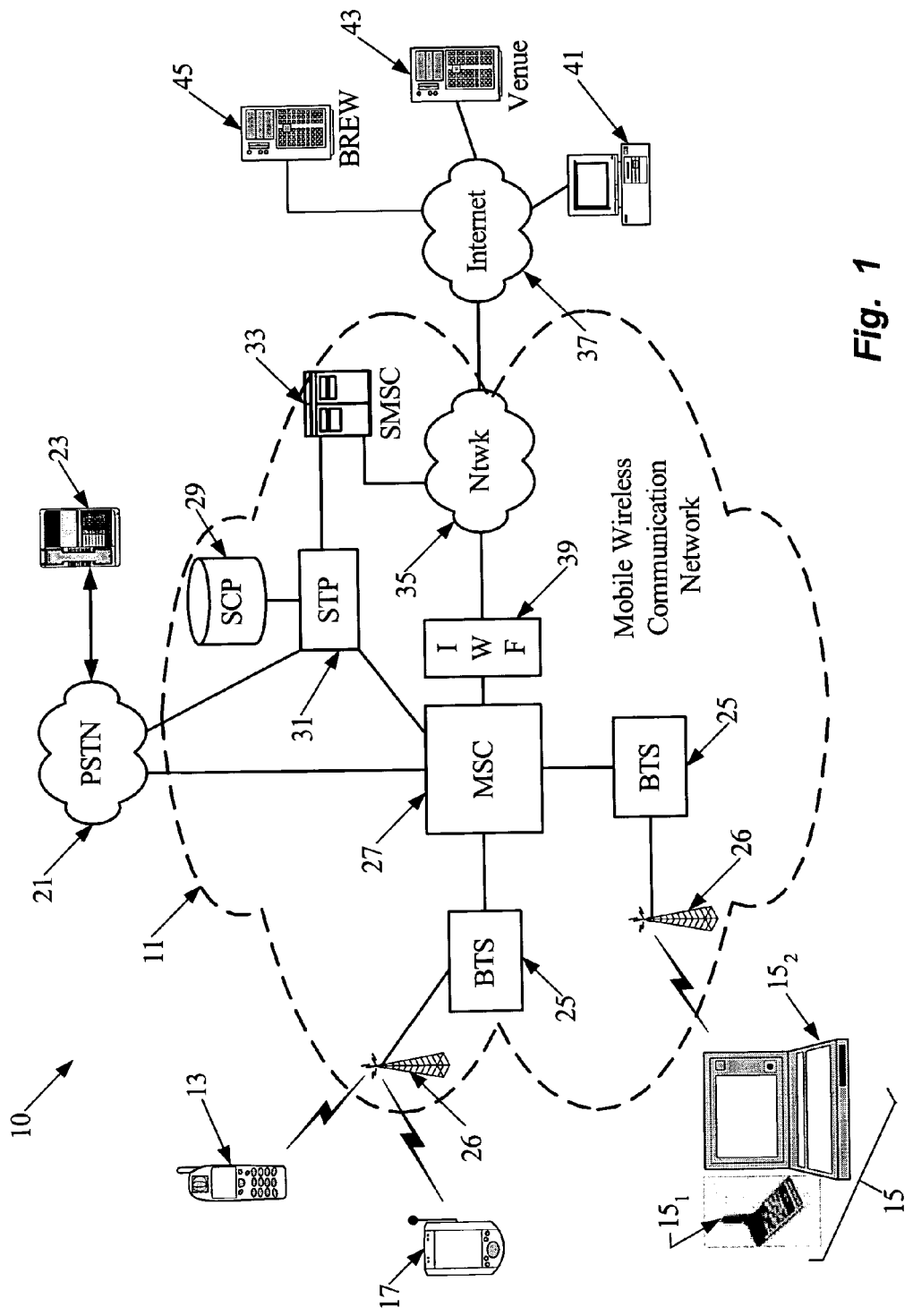
FIG. 1 is a functional block diagram of an exemplary system offering various telecommunication services and capable of handling mass communication events, such as voting.

Reference now is made in detail to the examples illustrated in the accompanying drawings and discussed below. The traffic control technique for a mass communication event entails programming mobile stations to randomly delay their transmissions or transmission attempts through a wireless network. To appreciate such traffic control regarding mass communication events, it may be helpful first to consider a high-level example of a wireless network that may benefit from the random delay mechanism to control subscriber communications during such events. FIG. 1 is a functional block diagram of an exemplary system 10 for handling mass communication events. As discussed more below, the illustrated system 10 includes a wireless mobile communication network 11, for providing mobile voice telephone services and data services, which may include mass event communications, in the form of calls or various types of data messages.

In general, the communication network 11 provides mobile voice telephone communications as well as certain data services, for numerous mobile stations. For purposes of later discussion, three mobile stations 13, 15 and 17 appear in the drawing, to represent examples of several different types of the mobile stations that may receive services via the network 11, including call-in or messaging services for mass communications events, like voting.

The station 13, for example, may take the form of a mobile telephone station, enhanced with display and user input capabilities to support certain text and image communications, such as e-mail, picture communication and web browsing applications. The station 13 may support transmission and reception of text messages, via a Short Message Service (SMS) available through the network 11. Today, such mobile telephones 13 typically take the form portable handsets, although they may be implemented in other form factors. The station 15 is a portable computing device, specifically, comprising a wireless modem card 15, inserted into a handheld or laptop personal computer (PC) $15_2$ or the like. Although shown as a separate card, the modem 151 may be integrated into the PC $15_2$. Alternatively, the PC may connect to a handset device, similar to the handset type mobile station 13. The station 17 takes the form of a personal digital assistant (PDA) incorporating a wireless transceiver compatible with one or more of the text messaging and packet data services offered by the network 11. Of course, the mobile stations may take other forms or connect to a variety of other data devices that may enable use of the network communication services. For purposes of the present discussion, all of the mobile stations 13, 15 and 17 which may participate in mass communication events, are programmable. A program relating to the mass communication event, e.g. a voting application, controls at least some operation of each such station during an event.

The network 11 enables users of at least some of the mobile stations to initiate and receive telephone calls to each other as well as through the public switched telephone network (PSTN) 21, for example, for communications with landline telephone devices 23.

Physical elements of a radio access network (RA) portion of network 11, operated by one of the many wireless carriers, include a number of base stations represented in the example by the base transceiver systems (BTS) 25, each of which communicates via an antennae system 26 and the air-link with one or more of the mobile stations 13, 15 and 17, when the mobile stations are within range. The BTS 25 is the part of the radio network that sends and receives signals to/from the mobile stations that the base station currently serves. A base station typically includes a BTS 25 coupled to several antennae, forming system 26, which are mounted on a radio tower within a coverage area often referred to as a "cell."

The base station transceivers (BTSs) 25 provide two-way communication over the air to mobile stations 13, 15 and 17. The present teachings are applicable to a variety of different wireless technologies supporting voice and/or data communications. In the examples, air-link communications between the base stations 25, 27 and the mobile stations 13, 15, 17 utilize code-division multiple access (CDMA) type spread spectrum communications. For example, the system might operate in accord with the IS-95 standard, or a next generation wireless network implementation might operate in accord with 3rd Generation Partnership 2 (3GPP2), Wireless IP Network Standard, 3GPP2 P.S0001-B, Version 1.0.0 3GPP2, version date Sep. 17, 2001 or the emerging Evolution Data Only (EVDO) standard. The principles also may be implemented in other cellular communications networks, for example, based on TDMA or GSM standards or even those still utilizing legacy analog standards such as AMPs. It is also conceived that the present teachings may be implemented in wireless packet data networks, such as public or private wireless local area networks (WLANs). For discussion purposes, it is assumed that the network 11 implements a CDMA cellular protocol, such as IS-95 or the CDMA 2000 standard.

A typical current example of the cellular network 11 also includes a number of radio access network switches. The drawing shows one such switch 27. The switches 27 typically are modern versions of mobile switching centers (MSCs) or Mobile Telephone Switching Offices (MTSOs), which support both cellular voice and packet data services. Each MSC switch 27 connects through trunk circuits to a number of the BTS base station transceivers 25, which the respective switch serves and controls. In a network providing voice telephone services, each MSC switch 27 also typically connects via trunk circuits to the PSTN 21. Newer network implementations, such as those for the EVDO type implementation, eliminate the traditional switches and instead utilize a packet switched network architecture.

The BTS 25 at a base station assigns and reassigns channels to the mobile stations 13, 15 or 17 that it serves and monitors the signal levels to recommend hand-offs to other base stations. The network 11 typically includes a base station controller (BSC) functionality that controls the functions of a number of base stations and helps to manage how calls made by each mobile station are transferred (or "handed-off") from one serving base station to another. Each wireless network equipment vender implements this function differently. Some vendors have a physical entity, which they call a BSC (not shown), while other vendors include this functionality as part of their MSC switch 27. Newer network implementations, such EVDO, which uses a packet switched network architecture, include a packet control function (PCF), typically associated with the base station transceivers.

To control service authorization and provide program control for certain advanced service features, the carrier operating the wireless network 11 also operates a home location register (HLR) that stores subscriber profiles and related call processing control information for each of that carrier's wireless subscribers and their associated mobile stations 13, 15 and 17. The HLR may reside in the home MSC, however, in the example, the HLR resides in a centralized node sometimes referred to as a service control point (SCP) 29. The SCP 29 communicates with the MSCs 27 via data links and one or more signaling transfer points (STPs) 31 of an out-of-band signaling system, typically, a signaling system 7 (SS7) network. As recognized in the art, the HLR stores for each mobile subscriber the subscriber s mobile telephone number, the mobile identification number, and information specifying the wireless services subscribed to by the mobile subscriber, such as numeric paging or text-based paging, data communication services multiple alerting, SMS, etc. The HLR also stores information indicating each subscriber's station's current point of attachment to the network 11 or to remote visited networks, to allow routing of voice or packet data calls to roaming mobile stations.

The STP 31 also provides a signaling communication link to a short message service center SMSC 33. The SMSC 33 also connects to an IP network, in this case a private data network 35 utilized by the carrier, to allow the SMSC to receive and send messages in IP packet format. Wireless carriers have developed the short message service (SMS) to transmit text messages for display on the mobile stations. The SMSC 33 is a standard messaging computer used in cellular networks today to offer SMS services to cellular customers. The SMSC 33 receives IP packet communications containing messages, such as e-mail, intended for transmission to mobile stations 13, 15 and 17 and forwards them to the appropriate MSC 27 via the STP 31 and the SS7 signaling link sets. The MSC 27, in turn, transmits each SMS message over a signaling channel of the radio access network to the intended mobile station 13, 15 or 19.

Modern implementations of SMS services also allow users to send messages from their mobile stations for forwarding to other mobile stations or for packet data communication to other devices. Of note for purposes of the present discussion, the SMS message communications provide one form of communication for a mass communication event, for example voting.

Voting services or the like may also allow participants using mobile stations, such as handsets 13, to dial-in. Some network operations of this type may complete such calls, whereas other implementations count dial-in attempts to a specified number as votes, without actually completing calls through the network. For example, the number may trigger a query to the HLR, in which case the HLR counts queries as votes. Other implementations accept votes as data messages using packet data communication capabilities, which will be discussed below.

The network 11 also enables users of the mobile stations to initiate and receive various data communications, for example through the private data network 35 operated by the carrier, to the public data network referred to as the Internet 37. For this purpose, the network 11 includes a packet data communication interface 39 connecting the MSC 27 to the data network 35. In the example, the interface is a unit for providing an interworking function (IWF), between the protocols used within the MSC 27 and the packet protocol(s) used on the network 35. In other implementations of the network 11, the interface may take other forms, such as a Packet Data Switching Node (PDSN).

Data communications through the MSC 27, the IWF 39 and the network 35 allow users of the mobile stations to send or receive data to or from other digital devices (represented by way of example by a PC 41 and one or more servers discussed more later) that otherwise have access to the Internet 37 or another network (e.g. private intranet) coupled to the data network 35. The data communications typically provide transport for various information in Internet Protocol (IP) packets, for routing or packet switching communications through Intranets or through the Internet.

In the example, the packet data communications enable communications with two exemplary servers 43 and 45. In a voting type application, the server 43 represents a data processing system for collecting and counting votes, although the server may support other applications some of which may entail other types of mass communications events. The server 45 represents a server used for downloading programming to the mobile stations served by the network 20, in this example, a BREW server. In the illustrated example, servers such as 43 and 45 are intended to represent a general class of data processing device commonly used to run "server" programming. Such a device typically utilizes general purpose computer hardware platform to perform its respective server processing and to control the attendant communications via the network(s). Each such server, for example, includes a data communication interface for packet data communication. The server also includes a central processing unit (CPU), in the form of one or more processors, for executing program instructions. The server platform typically includes program storage and data storage for various files to be processed and/or communicated by the server, although the server often receives programming and data via network communications. The hardware elements, operating systems and programming languages of such servers are conventional in nature, and it is presumed that those skilled in the art are adequately familiar therewith.

The packet data communication services may support mass message traffic, for example the casting of votes in a popular voting application. Such communications would entail sending data messages regarding votes to a server 43 associated with the voting venue. The SMSC 33 will similarly forward votes received as SMS messages as IP packets, through the network 35 and the Internet 37, to the server 43 of the voting venue. If the voting takes the form of dial-in or actual voice calls, a network element such as the SCP 29 or a billing computer (not shown) accumulates voting data and forwards that data to the server 43 for counting together with votes received via any of the other supported voting techniques. Of course, one or more nodes in the network 11 could tally the votes and simply forward the results to the venue server 43.

Of note for purposes of this discussion, the packet data communications services also support downloading of application software over the air to the mobile stations 13, 15 and 17, for example, from the server 45. One such application which will be downloaded to mobile stations controls performance of the stations during mass communication events. In the voting example, this download capability provides a convenient mechanism to distribute the voting application software to the mobile stations.

During mass end-user messaging events, (such as voting for televised game or reality show or sports event voting), very large numbers of subscriber generated short messages are generated and transmitted via the wireless network 11 in a very short time interval. This condition requires that the wireless network 11 be engineered to support this type of peak loading which can be very costly or impractical. A more detailed discussion of the software downloading is provided later. The proposed concept is for the mobile devices 13, 15, 17 to randomize and distribute the transmissions of the subscribers' messages over a specified longer time window (5, 15, 30 minutes, etc.). Although applicable to other types of mass communication events, it may be helpful to consider voting by way of example.

Mass voting events encourage viewers to vote, through SMS messaging, by dialing a 10 digit phone number, by sending packet data messages as e-mails, or the like. The network operator or a third party provides a "Voting" application for the mobile stations, for example, as a downloadable BREW based application supplied by the server 45 for installation in the mobile stations 13, 15 and 17 of the interested mobile subscribers. Of course, other programming techniques, such as the Java based J2ME for wireless, may be used to develop the application for particular types of mobile stations. PDA or PC implementations of the mobile stations may use other programming techniques common to those types of devices. It is also envisioned that the application may be pre-loaded in one or more of the mobile stations before distribution to the customers.

The voting application contains a menu, listing of all supported voting venues. An optional "Other" field could allow the subscriber to enter any non-listed SMS or 10-digit phone number. Embedded in the application code is a MIN/MAX time delay window per voting venue. For example, a MIN=5 minutes implies that the vote is to be delayed at least 5 minutes, whereas a MAX=30 minutes implies that the vote will not be delayed more than 30 minutes. The mobile station uses the MIN/MAX values and a random number generation algorithm to compute a random time offset within the specified time window, for message delivery.

Figure 2:
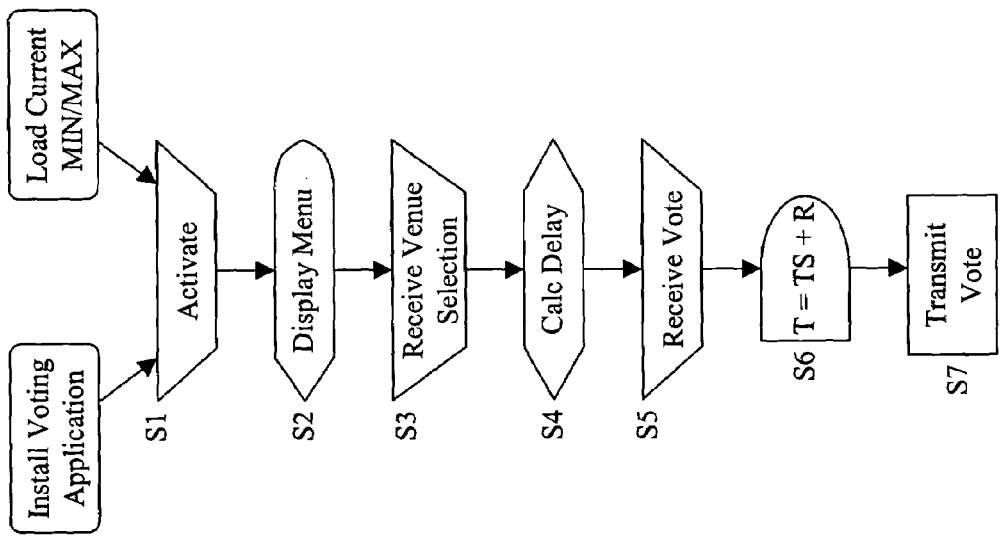
FIG. 2 is a simplified flow diagram, useful in understanding the mobile station operations during a voting example of a mass communication event.

It may be helpful to consider one possible usage scenario, by way of an example, with reference to a sample flow diagram as shown in FIG. 2. For purposes of this example, assume that the mobile network subscriber, who desires to cast a vote, is using the handset type mobile station 13. At some earlier time, the voting application has been installed in that station by loading the application into memory. Either as part of that installation or in a separate voting data update operation, the current MIN/MAX values have been loaded into memory in the mobile station 13. At the time of the event, the station is ready for voting.

The voting application could be activated by other means or always running in the background, but in this example, the application is designed for user activation when the user is considering participation in a voting event. Initially, the user activates the voting application (S1), which causes the mobile station to present a menu to the user (S2). The menu, for example, lists the venues for which people can vote via services of the wireless mobile communication network 11. If the mobile network user wants to vote in a particular media program, e.g. a "XYZ Beauty Pageant," the subscriber selects (at S3) the venue by name from the menu, e.g. by selecting "XYZ Beauty Pageant" in our example, when the Voting Application menu is displayed in step S2.

In response to receiving the venue selection at S3, the Voting Application will retrieve MIN/MAX values for use in calculating the random delay. These values may be preconfigured MIN/MAX values, for example, contained in the software download installed with the voting application. Alternatively, the mobile station may communicate with a server 43 or 45 separately from the application download, but prior to the voting event, to obtain the current MIN/MAX values for the particular venue. For example, the voting application could periodically cause the mobile station 13 to access the server 43 or 45 through the network 11, at off-peak times, and update the venues, contestants' names, and MIN/MAX time values.

In any case, at the time of the event (FIG. 2), the mobile station 13 will have such values available, and in step, S4, the mobile station processor uses those values to calculate a random delay. Although the processor may calculate the delay after entry of the vote or at another convenient point in the process, for ease of illustration and discussion, it is assumed that the random delay is calculated upon selection of the venue. Each venue supported by the voting application may independently specify MIN/MAX values for its events. Essentially, the mobile station 13 calculates a random delay value (R) between in the range between the MIN and MAX values for the selected voting venue, American Idol in our example. Typically, the random delay value R is the sum of the MIN value plus a calculated random number, where the value of R is less than the MAX value.

At step S5, the user of the mobile station enters her vote. Receipt of the vote input from the user (S5), by the voting application, effectively activates the mobile station to submit the vote. The mobile station 13 timestamps the vote, and it begins timing the delay interval (S6). Essentially, the mobile station 13 waits (during the delay at S6) until it reaches a current time value (T) equal to the timestamp (TS) plus the calculated random value (R). For this purpose, the mobile station processor enters a process loop in which it checks the current time and continues to wait if the current time has not reached the calculated time value TS+R. When current time T in the mobile station equals the calculated value TS+R, the mobile station transmits the subscriber's vote over the air (S7), and the wireless network communicates the vote to the server 43 for the selected voting venue, that is to say the American Idol server in our example.

The transmission initiated at S7 may be an SMS message transmission containing the vote information or to an address associated with the selected vote. SMS vote data may be tallied in the network, or the SMSC 33 may simply forward the transmissions on to the server 43 associated with the venue. If the SMS messages are forwarded, the SMSC 33 may forward the messages in real time as they are received, or the SMSC 33 may delay or buffer messages for batch processing and batch forwarding to the venue server 43. Alternatively, the communication may entail dialing of digits corresponding to the vote, although depending on the service offered by the network 11, the network may or may not complete the dialed calls. If completed, completed calls to the dialed destinations are counted as votes. If calls are not completed, the network counts the number of times mobile stations dial the various voting numbers, compiles the data and supplies the data to the venue server 43 as vote tallies. Alternatively, the voting application may utilize packet communications through the network 11 to the venue server 11.

Some carriers may offer voting services using various combinations of these vote communication techniques. Those skilled in the art will recognize that the present teachings may also be applied to other network techniques for processing voting communications through the network 11. However, any and all transmissions for such voting communications are randomly delayed by operation of the voting application in each voter's mobile station 13, 15 or 17.

Based on the type of voting and tolerance to delay from the voting sponsor, the subscribers' votes could be delayed sufficiently to spread the network load and minimize usage spikes. The spreading of the peak loading caused by each event reduces network overbuild requirements and attendant costs needed to support voting induced usage spikes. The throttling of the event traffic also enhances the network service provider's ability to offer voting or similar services to venues or sponsors not willing to support their own mass voting event. The system could utilize network statistics to measure number of SMS messages sent to an address provided by the network operator. In such a case, the carrier would tabulate votes for venue.

For some users, there may be additional communication at or around the time of the event, however, such communications should be minimal. For example, when activated, the application may check the age of its operational data, e.g. by comparing the date of the venue menu (and associated MIN/MAX data) to the current date. If the date comparison shows that the menu and related data are out of date, the application may cause the mobile station to initiate a session with a server to obtain up to date information. It is preferable that this type of operation be the exception. In most cases, the mobile station should obtain the venue and control data at times independent of or unrelated to either the time of the event or the timing of the user's desire to participate in an event, for example, by periodic communication at off-peak times.

It is assumed that those skilled in the art are familiar with the structure and operation of the mobile stations 13, 15 and 17. The discussion herein focuses on controlling timing of call-in or message transmission, during mass communication events, at the mobile station level. Although the relevant application could be built-in at the time of manufacture, the example, also entails downloading relevant programming for loading into and execution in the mobile stations. To insure a full understanding by all readers, it may be helpful to consider a high level summary review of the relevant structure of one example of a mobile station.

Figure 3:
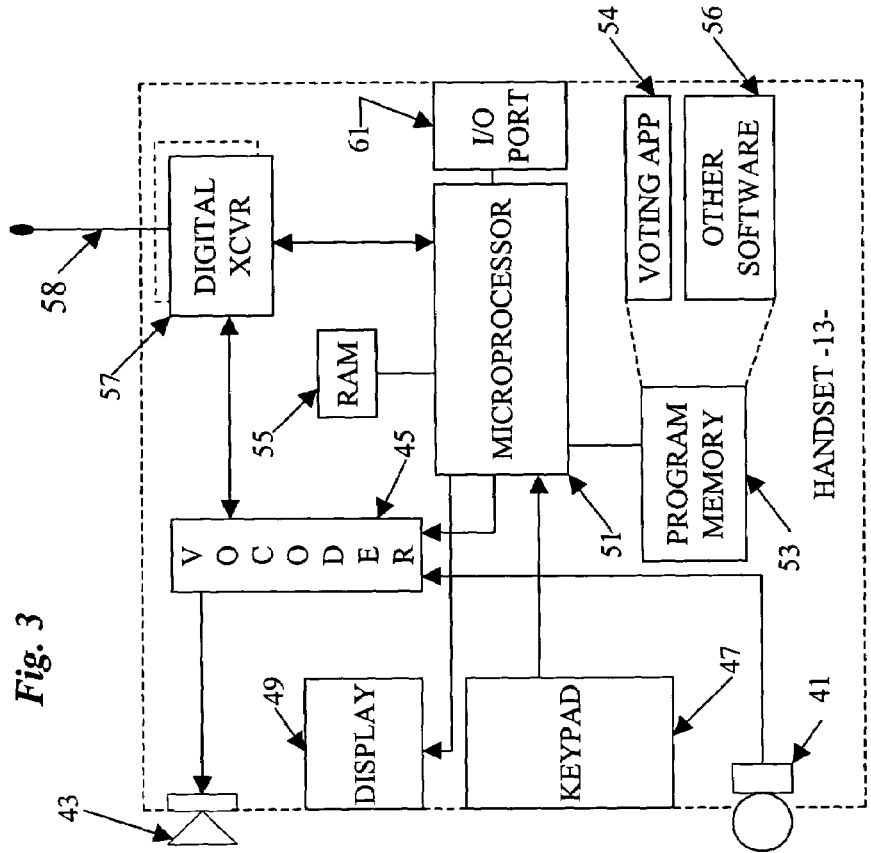
FIG. 3 is a functional block diagram of an exemplary mobile station, in the form of a cellular telephone handset, capable of operation in the network of FIG. 1.

FIG. 3 is a functional block diagram illustrating a digital telephone implementation of the mobile station 13. The PDA mobile station 17 may have a similar structure, although it typically lacks the elements for voice communication and instead will utilize different user interface (input/output) elements and may have more processing and memory capacity.

Although the station 13 may be incorporated into a vehicle mounted mobile unit or into another device, such as a portable personal computer or PDA, for discussion purposes the illustrations show the station 13 in the form of a handset. The handset embodiment of the mobile station 13 functions as a normal digital wireless telephone station. For that function, the station 13 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 13 also includes a digital transceiver (XCVR) 57. The teachings discussed here encompass embodiments of the station 13 utilizing any digital transceivers that conform to current or future developed digital wireless communication standards. For example, the transceiver 57 could be a EVDO, TDMA or GSM unit designed for cellular or PCS operation. In the present embodiments, the digital transceiver 57 is a CDMA transceiver compatible with operation via an IS-95 network or a CDMA 2000 network, to provide both voice and/or data communications. As represented by the dotted line box behind the digital transceiver 57, the mobile station 13 may include one or more additional transceivers, to support an alternate digital protocol, communications via additional band(s) of the spectrum and/or an analog communication protocol.

The transceiver 57 provides two-way wireless communication of information, such as vocoded speech samples and digital message information. The transceiver also sends and receives a variety of signaling messages in support of the various services provided via the station 13 and the network 3, including those used to carry SMS messages. Further, the transceiver 57 may provide packet data communication, including information regarding votes. The transceiver 57 connects through RF send and receive amplifiers (not separately shown) to an antenna 58.

As shown, the digital telephone handset 13 includes a display 49 for displaying messages, a menu generated by the voting application, outputs produced by a client browser program or the like, call related information dialed and calling party numbers, etc. A keypad 47 enables dialing digits for voice and/or data calls and generating selection inputs keyed by the user based on the displayed information. Of note, these user input and output elements are used for display of menus and other information to the user and user input of selections, for the applications relating to the mass communications events, for example, for selection of venues and casting of votes. Of course other user interface elements may be used, such as a stylus and touch sensitive display screen, as in a PDA.

A microprocessor 51 controls all operations of the handset station 13. The microprocessor 51 is a programmable device. The mobile unit 13 also includes flash type program memory 53 and/or a non-volatile random access memory (RAM) 55, for storing various software routines and mobile configuration settings, such as mobile identification number (MIN), etc. As discussed more later, the stored software will include at least one application such as a voting application 54, for control of features and communications functionalities related to the mass communication event. In a present implementation, the program memory 55 stores other software 56, such as an operating system, vocoder software, client browser software, device driver software, call processing software and short message service software. The memories also store data, such as telephone numbers server addresses and data input by the user via the keypad 47.

A cellular telephone implementation of the mobile station 13 may also include an input/output (I/O) port 62 coupled to the microprocessor 51. The I/O port 62 enables two-way exchange of data between the mobile station 13 and an external device, such as a portable computer 15$_2$, for example to allow the mobile station 13 to act as modem or the like for data communication services for the portable computer through the network 11.

The structure and operation of the mobile station 13, as outlined above, were described to by way of example, only.

The present techniques for controlling mobile station operations during mass communication events, such as calling or messaging for voting or the like, utilize application software loaded into the mobile stations. A variety of techniques may be used to load the software into the mobile stations, for execution during voting or the like. In the example, the downloading utilizes over-the-air data communications techniques. The software downloads occur at times independent of or unrelated to the timing of the event. Since such communications are separate, they do not contribute to the traffic load caused by any event.

Although those skilled in the art are presumably familiar with software installation techniques and the equipment for implementing over-the-air downloading, for some readers, a brief review and discussion of an example with regard to programming the handset station 13 may be helpful. Manufacturers have developed wireless devices, such as cellular telephones, with increasing processing power, fast approaching the computing capabilities of devices such as personal computers and personal digital assistants (PDAs). Because of this increased processing power, mobile stations 13 actually can be programmed to perform a wide range of application functions, for example related to tools for productivity enchantment, gaming, entertainment and the like. However, due to their small size, the program storage capacity of the mobile station typically is quite limited.

A number of different vendors therefore developed competing approaches to downloading application software into the mobile stations. Downloaded software may be replaced with other software, e.g. as the user chooses other desired applications. Generally, the mobile station has embedded software, including an operating system and an application program interface (API). Although the station hardware and/or the operating system may be unique and even proprietary, the API is a published standard. As a result, virtually any software developer can write application programming to the API, and the application program will run properly on all mobile stations 13 implementing the standard API. Qualcomm products, for example, utilize the binary runtime environment for wireless (BREW) as the API. Java 2 Platform, Micro Edition (J2ME™) is another runtime environment targeted to a wide range of consumer products, which some cellular telephone developers are utilizing for the standardized API.

Based on these APIs, a number of the carriers, vendors and third parties are now offering application downloading as an additional pay service, through the wireless networks. Mobile station users can customize their wireless telephones through the selective downloading of applications of interest, such as games, printed media, stock updates, news, or any other type of information or application that is available for download through the wireless network. The user pays for the downloaded software as well as any airtime used for the download. Many of the applications, such as games and calendar programs, are run on the station off-line, without ongoing communications through the wireless network 11. Some of the downloaded applications however, stock or news update routines for example, use the communication capabilities of the mobile station and the network to implement at least some ongoing application functionality, as would the voting application.

To offer product software downloading as a commercial service, the carrier or a third party vendor operates an application download server (ADS) on a packet-switched data network which is accessible by a data call from a compatible mobile station. In general, a user having a mobile station 13 with an API and having subscribed to the download service initiates a data call through the network 11 to the ADS. After log-in, the station 13 receives and displays one or a series of menus listing available applications. The user views the list of available applications and makes a selection, which the mobile station 13 communicates through the network to the ADS server. The server then transmits the selected application through the network 11 to the mobile station 13, and the mobile station stores the new program in memory 53. Subsequently, the processor 51 of the mobile station calls-up and executes the downloaded application program, for example, allowing the user to play a new game on the mobile station.

Such download services are gaining in availability and popularity; and software developers are rapidly providing a wealth of new applications.

It is assumed that the mobile stations 13, 15 and 17 (FIG. 1) are of types implementing one of several common application program interfaces (APIs) under the different software standards for mobile stations, such as BREW, J2ME or the like. Currently, many implementations of the handsets 13 support application downloading, using BREW. Many available PDAs 17 support J2ME, although PDAs that support BREW are becoming commercially available. Compatible mobile stations thus are capable of receiving compatible software downloads and locally running the downloaded application software, albeit for the respective one of the software standards that the particular station supports. To conduct such downloading, the stations 13, 15 and 17 also are capable of packet data communications through the network 11, although such data communications of course enable a variety of other communication applications/services through the network 11.

To utilize the download service, a user with a mobile station, for example station 13 initiates a packet data communication session or "call" through the network 11 to a data center containing server 45 (see FIG. 1). For this example, assume that the server 45 supports BREW. In response to a data call from the mobile station 14 to the download service provider, the network provides the appropriate wireless communications and routes the data call through the IWF interface 39, the private data network 35 and Internet 37, enabling two-way packet data communications with the BREW server 45.

Although not separately shown, the data center may comprise a content switching type intelligent router and a number of servers providing both web type interactivity and stored software for downloading. For convenience, the ADS server and these other software downloading elements are represented collectively and generically by the BREW download server 45.

The download server 45 enables downloading of at least one application relating to a mass communication event, which controls dial-in or message transmission in accord with a randomized delay, as outlined above. Assuming that the mass communication event relates to voting, the user, for example operating mobile station 13, would communicate through the network 11 and the Internet 37 with the server 45; and the server would send a BREW based voting application 54 through the networks to the mobile station 13. The station 13 stores the received application 54 in its program memory 53. When the user later wants to participate in an actual voting event, the microprocessor 51 invokes the voting application; and that application enables user selection of venue and voting; and the application controls the timing of transmissions from the mobile station 13 through the wireless mobile communication network 20.

The application, such as voting, may also offer incentives structured with the voting sponsor through network based vote counts, reduced charges (if applicable), ad placement on other carrier provided services such as the carrier's own Homepage, free SMS alerts to voting application users. Subscriber use of the mobile station voting application could be encouraged through credits, free downloads and random drawings for prizes. Such techniques encourage mobile voting participants to download and utilize the voting application, which thus facilitates the application's control of the timing of the voting traffic.

Aspects of the methods outlined above may be embodied in software, e.g. in the form of program code executable by the mobile stations or other programmable device. Such software typically is carried on or otherwise embodied in a medium or media. Terms such as "machine-readable medium" and "computer-readable medium" as used herein generically refer to any medium that participates in providing instructions and/or data to a programmable processor, such as the CPU of a mobile station or in any other programmable device having the capability for communicating through a wireless mobile network during a mass communication event. Such a medium may take many forms, including but not limited to, non-volatile media, volatile media, and transmission media. Non-volatile media include, for example, optical or magnetic disks. Volatile media include dynamic memory, such as main memory or cache. Physical transmission media include coaxial cables; copper wire and fiber optics, including wired and wireless links of a network and the wires that comprise a bus within a computer or the like. Transmission media, however, can also take the form of electric or electromagnetic signals, or acoustic or light waves such as those generated during optical, radio frequency (RF) and infrared (IR) data communications. Hence, common forms of machine-readable media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, a FLASH-EPROM, a cache memory, any other memory chip or cartridge, a carrier wave transporting data or instructions, physical links bearing such a carrier wave, or any other medium from which a computer, processor or the like can read in order to read or recover carried information.

Various forms of machine-readable media may be involved in carrying one or more sequences of one or more instructions to a processor for execution. For example, all or portions of the software to perform the functions of the exemplary voting application may at times be communicated through the Internet, an Intranet, a wireless data communication network, or various other telecommunication networks. Such communications, for example may serve to load the software from another computer (not shown) into the download server 45 and from there to the mobile station(s), to implement the method of randomizing of transmission timing, to mitigate the mass message or call traffic of the voting event.

FIG. 4 provides time graphs of message traffic and random delays. The top portion of the graph depicts timing of user inputs. Assume for example, that the event involves voting. The sponsor will typically advertise a time window during which participants are to dial-in, call-in or send SMS or other text messages to cast their votes. In the example of FIG. 4, the advertised window is from 0-30 minutes. The plot A represents an approximation of the timing of user inputs attempting to vote in and around the window. The plot is intended as an example only, and may not realistically reflect actual input timing.

In the example of plot A, there is a relatively high peak input level about 10 minutes into the advertised 30-minute time window. Large numbers of wireless network subscribers input their votes for communication via the wireless network, in a very short time interval, particularly in the range of 5-15 minutes after the start of the advertised window. Without any delay, these inputs would result in substantially concurrent attempts by users' mobile stations to transmit voting related communications through the network 11, that is to say very large numbers of subscriber generated calls or short messages would be attempted in a very short time interval. If simply transmitted as users enter their votes during such a mass end-user messaging event, some portion of the traffic at or near the peak load might well exceed the capacity of the wireless communication network 11.

With the disclosed technique, however, each mobile station imposes a randomized delay, before actually sending the relevant communication through the network 11. The middle portion of the graph of FIG. 4 depicts an example of a random time delay function, in the form of an approximately Gaussian distribution B with a 5 minute offset (MIN) from the time of vote entry. The Gaussian distribution represents only one possible example of a distribution that may result from a random number generation algorithm. Other random number generation schemes may generate other delay distributions, for example, a white noise-like distribution. Also, the algorithm may use a different constant minimum delay, e.g. 0, 1, 5, 10, 15 or 30 minutes, etc.

In each mobile station, in response to the user input (vote in our example), the mobile station generates a random delay value and transmits only after the random delay interval. The effect is to apply the random delay distribution B to the user input distribution A, so as to spread and reduce the actual distribution of the message transmissions, as represented by the plot C in the illustrated example. Although the actual traffic distribution may vary from that shown, the effect is to substantially reduce the peak network load by distributing the actual network traffic related to the event over a wider period of time. The sponsor of the event would actually accept message transmissions for a longer (probably unadvertised) time window, say 60 minutes or longer in our example. By substantially reducing the peak load, the network 20 may be able to handle the entire event without any call or message blocking. Different random number generation algorithms, e.g. a white noise algorithm, used to generate the random delay intervals, may enhance the spreading and leveling effect on the resultant user traffic in the mass communication event.

In the above examples, the random delay generation algorithm typically utilized a Gaussian distribution and defined minimum (Min) and maximum (Max) delay limits, although a white noise distribution was also mentioned as another sufficiently random distribution. Those skilled in the art will recognize that other random or pseudo-random distribution functions may be used as the algorithm for generating the so-called "random" delay value. Also, such a function may be seeded with various relevant data to produce a desired delay distribution. Instead of the Min/Max delay values, for example, the mathematical function that generates the 'random' delay could utilize input or starting data of various types, including for example: MIN, MDN or ESN numbers e mobile stations, last digits of MIN/MDN/ESN of the mobile stations, time of day, and expected network load/capacity.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A method of conducting a mass communication event via a wireless communication network, comprising steps of:
   (a) at a time prior to and independent of time of the mass communication event, programming users' mobile stations with one or more parameters for control of a random delay calculation function related to the mass communication event;
   (b) at each respective one of the mobile stations, executing steps comprising:
      (i) during the time of the mass communication event, prompting a user of the respective mobile station for and receiving an input from the user relating to the mass communication event;
      (ii) calculating a random delay interval to extend from the time of receiving the user input, based on the programmed one or more control parameters;
      (iii) delaying for the calculated random interval; and
      (iv) after expiration of the calculated random delay interval following receipt of the user input, attempting a communication through the wireless communication network regarding the input from the user relating to the mass communication event; and
   (c) processing randomly delayed communications from the mobile stations through the wireless communication network regarding the user inputs relating to the mass communication event.

2. The method of claim 1, wherein the attempted communication comprises a transmission selected from the group consisting of: dialing a number associated with the mass communication event through the wireless communication network; sending a short message service (SMS) message regarding the input from the user through the wireless communication network; and sending a packet data communication regarding the input from the user through the wireless communication network.

3. The method of claim 1, wherein the step of programming comprises downloading the one or more parameters for control of the random delay calculation function to the users' mobile stations over the air through the wireless communication network, and the downloading occurs.

4. The method of claim 1, further comprising downloading application software to each of the mobile stations over the air through the wireless communication network, wherein execution of the downloaded software causes each respective mobile station to perform the steps (i) through (iv).

5. The method of claim 4, wherein the downloaded application software includes programming for implementing the random delay calculation.

6. The method of claim 1, wherein the mass communication event is a voting event, and each communication through the wireless communication network regarding user input indicates a user's vote.

7. The method of claim 1, wherein the mobile stations implement the calculating, delaying and attempting communication steps without receiving any messages through the wireless communication network regarding programming of delay control parameters around or during the time of the mass communication event.

8. A product comprising a machine readable storage medium and application software embodied in the machine readable storage medium, for controlling operations of a mobile station through a wireless communication network, the application software comprising programming causing the mobile station to perform steps related to a mass communication event, comprising:
at a time prior to and independent of time of the mass communication event, storing in the mobile station one or more parameters for control of a random delay calculation function related to the mass communication event;
during the time of the mass communication event, prompting a user of the mobile station for and receiving an input from the user relating to the mass communication event;
calculating a random delay interval based at least in part on the one or more parameters;
waiting for the calculated random delay interval; and
after expiration of the calculated random delay interval following receipt of the user input, initiating a communication through the wireless communication network regarding the input from the user relating to the mass communication event.

9. The product of claim 8, wherein the step of calculating comprises:
calculating a random value;
adding a fixed minimum delay value to the random value, to calculate the random delay interval; and
converting the calculated random delay interval to a time by adding the calculated random delay interval to a time of receiving the input from the user relating to the mass communication event, for comparison to current time to determine the expiration of the calculated random delay interval.

10. The product of claim 8, wherein the one or more parameters comprise predetermined minimum and maximum delay values, and the step of calculating comprises calculating a random value for delay between the predetermined minimum and maximum delay values.

11. The product of claim 10, wherein the software also causes the mobile station to obtain the predetermined minimum and maximum delay values via a communication through the wireless communication network at the time prior to and independent of the time of the mass communication event.

12. The product of claim 8, wherein the mass communication event relates to voting and the input from the user relating to the mass communication event comprises a user's vote.

13. The product of claim 8, wherein the input from the user further comprises a selection of a venue from among a plurality of possible voting venues served via the wireless communication network.

14. The product of claim 8, wherein the programming is adapted for downloading to the mobile station via a communication through the wireless communication network.

15. A mobile station comprising:
a memory storing programming, including application software;
a processor coupled to the memory, for accessing and executing the programming; and
a wireless transceiver controlled by the processor, for digital communication over-the-air via a wireless mobile communication network,
wherein execution of the application software causes the processor to control operations of the mobile station so as to perform steps in relation to a mass communication event, comprising:
at a time prior to and independent of time of the mass communication event, storing in the mobile station one or more parameters for control of a random delay calculation function related to the mass communication event;
during the time of the mass communication event, prompting a user of the mobile station for and receiving an input from the user relating to the mass communication event;
calculating a random delay interval based at least in part on the one or more parameters;
waiting for the calculated random delay interval; and
after expiration of the calculated random delay interval following receipt of the user input, initiating a communication through the wireless communication network regarding the input from the user relating to the mass communication event.

16. A method of sending a communication relating to a mass communication event through a wireless communication network, comprising steps of:
at a time prior to and independent of time of the mass communication event, storing in a mobile station one or more parameters for control of a random delay calculation function related to the mass communication event;
during the time of the mass communication event, prompting a user of the mobile station for and receiving an input from the user relating to the mass communication event;
calculating a random delay interval based at least in part on the one or more parameters;
waiting for the calculated random delay interval after receiving the user input; and
after expiration of the calculated random delay interval, initiating a communication from the mobile station through the wireless communication network regarding the input from the user relating to the mass communication event.

17. The method of claim 16, wherein the mobile station implements the calculating, waiting and initiating communication steps without receiving any messages through the wireless communication network regarding programming of delay control parameters around or during the time of the mass communication event.

* * * * *